UNITED STATES PATENT OFFICE.

JOSEPH B. GARDINER, OF NYACK, NEW YORK.

METHOD OF OBTAINING FLUIDS FOR PRIMARY BATTERIES.

SPECIFICATION forming part of Letters Patent No. 460,277, dated September 29, 1891.

Application filed September 15, 1890. Serial No. 364,960½. (No specimens.)

*To all whom it may concern:*

Be it known that I, JOSEPH B. GARDINER, a citizen of the United States, and a resident of Nyack, in the county of Rockland and State of New York, have invented certain new and useful Improvements in the Method of Obtaining Fluids for Primary Batteries and of Recovering the Effective Matter from the Spent Fluid, of which the following is a specification.

My invention relates to primary batteries, and, more accurately speaking, to a method or process whereby I am enabled to obtain at one point thereof an efficient and comparatively cheap fluid for employment in the battery, and thereafter in the further employment of my method or process to recover the original substances employed in the process, together with the metal or the oxide of the metal which constitutes the electrode acted upon by the battery-fluid.

It has been known for many years to electricians and to others skilled in the art that the large cost of employing primary batteries is mainly due to the waste of zinc or other metal employed, and accordingly many efforts have been made to diminish as far as is possible the waste of metal and to recover it in such form that it may be reutilized or sold, as desired. These ends I have secured in the employment of my method, and this feature I regard as one of the principal advantages I secure.

Another important point gained is the obtaining of an electrolytic fluid possessing all the requirements of a high-grade electrolyte.

Other and further advantages arising under my method or process will appear in the detailed description thereof, presently to be set forth.

I desire it to be understood that I regard as comprised within the spirit of my invention and as fully embraced herein the broad method or process, one type of specific method or process thereunder included, and the various broad and specific sub-methods or sub-processes which may fairly arise from the practice of the general method and which are set forth in detail at the end of this specification in the claims. First in order I will indicate briefly the scope and extent of my general method and leave the description of the more specific parts to be gathered from the detailed account that follows. My general method, then, comprises these steps: first, separating a salt containing the depolarizing element into two parts, which I will designate for convenience as "part A" and "part B;" second, using part A, which contains the depolarizing element, singly or in connection with other substances in the battery-fluid; third, after part A becomes combined with the metal or becomes electrically "spent" separating out the metal or its oxide; fourth, combining what is left by step 3 with the part B, originally separated out, thereby obtaining the salt originally employed.

It will be at once obvious that this method is equally applicable to single-fluid and double-fluid batteries; but I intend to illustrate its application to a well-known form of double-fluid battery as most convenient. Further, my method may be carried out with a large variety of salts and other elements, and I do not desire to have it thought that the scope of the general method is limited either by the character of the materials described or by its application to a two-fluid cell. The two-fluid battery which I have selected to illustrate my method is, broadly speaking, of this type: In the interior porous cup is contained an electrode of zinc combined with mercury, either as an alloy or an amalgam, and a bath of slightly-acidulated water. In the exterior or containing cup is the carbon electrode and ordinarily a solution of bicarbonate of potash treated with sulphuric acid. I prefer to use, however, a bath of chromic acid in place of that of bichromate of potash and sulphuric acid for the reason that the latter, upon standing, forms very readily a double sulphate of chromium and potash, which attaches itself to the carbon and thereby seriously impairs its electric qualities in the manner well understood. For this reason I prefer to employ a dilute solution of chromic acid, which, when combined with its proper amount of dilute nitric acid or other acid or acid salt, keeps the electrodes free from deposition of foreign matter and throughout enables both the zinc and carbon to remain clean; or, still further, I contemplate the employment of chromic acid unassisted in the bath. However, it must be noted that the employment of dilute nitric or other acid or of the acid salt not only keeps the electrodes clean and free from deposition, but, further, it has the added value of supplying oxygen in the third step of my process. This one point of advantage in the employment of chromic acid in the bath is amply sufficient to warrant its substitution for the bichromate of potash; but it is further to be noted that the spent bichromate of potash, because of its complex form, is practically valueless so far as regards the recovery of the expended zinc or other elements.

Instead of using the commercial chromic acid, ($H_2CrO_4$,) which is obtained by combining trioxide of chromium ($CrO_3$) with water, ($H_2O$,) I obtain it quite as readily and cheaply from the treatment of "chrome-yellow" or chromate of lead with sulphuric acid. This step also enables me to secure a residuum which is of the utmost importance to me in the final step of the process. As an added advantage of this part of my method I would here state that the spent chromic acid, when the commercial form is employed, is not easily susceptible to treatment for the recovery of elements. By my method, however, I am enabled to employ a high grade of chromic acid, and further on to recover all or almost all of the original elements.

The reaction which constitutes step 1 of my process is practically as follows, the minor reactions being disregarded: Chromate of lead and sulphuric acid give me chromic acid (part A) and sulphate of lead (part B) $PbCrO_4 + H_2SO_4 + Aq = H_2CrO_4 + PbSO_4 + Aq$. It is true that chromic acid might have been obtained from the treatment of a saturated solution of bichromate of potash with hot sulphuric acid, which upon cooling would give chromic acid and bisulphate of potash. This proceeding, however, would involve not only the inconvenience of handling the hot sulphuric acid, but, further than that, the bisulphate is less readily dealt with in the final step of the process. The chromic acid is employed in dilution either with or without an additional acid or acid salt in connection with the carbon electrode. Osmotic action begins, the circuit having been closed. By exosmotic action the acidulated water with zinc flows into the outer or containing cup, and by endosmotic action the solution of chromic acid enters the interior cup, where it attacks the zinc. This continues until the difference in electric potential is lost, which marks the termination of step 2 of my method.

The baths, either combined or singly, are treated with an alkali carbonate, preferably carbonate of potash, and then evaporated and ignited in a reverberatory furnace in the customary manner. It will be seen that upon ignition the carbon supplied by the carbonate of potash is consumed and that chromate of potash and oxide of zinc remain. If nitric or other acid or acid salt were employed in combination with the chromic acid, it is at this point that the oxygen contained is liberated and unites with the zinc to form oxide of zinc. From the resulting product the chromate of potash can be readily dissolved out, and the zinc oxide remains. This operation constitutes step 3 of my process. Step 4 is then resorted to and is simple in theory and practice. The chromate of potash is combined with the sulphate of lead obtained in step 1 and constituting part B. This gives the original salt, chromate of lead, as a precipitate, and leaves sulphate of potash. The reaction may be generally expressed as follows: $K_2CrO_4 + PbSO_4 + Aq = PbCrO_4 + K_2SO_4 + Aq$.

To recapitulate, I will briefly state the various steps of my specific process in the same manner as I stated the broad or general method: first, treating chromate of lead with sulphuric acid and obtaining chromic acid (part A) and sulphate of lead, (part B;) second, using chromic acid in dilute solution as a battery-fluid with or without the aid of another acid or acid salt; third, treating spent chromic acid, &c., with carbonate of potash or other alkali carbonate, drying and igniting and dissolving out the chromate of potash, leaving zinc oxide; fourth, treating sulphate of lead (part B) with chromate of potash, giving chromate of lead and sulphate of potash.

As a slight variation of this specific method it is to be noted that carbonate of lime might have been employed in step 3 in place of carbonate of potash, in which case I would have obtained sulphate of lime in step 4. However, to obtain sulphate of lime from the sulphate of potash secured in step 4, as described, it is necessary merely to precipitate it with carbonate of lime or chalk, which at once gives me sulphate of lime and also carbonate of potash, which latter may be reemployed, as before noted in step 3. It is to be observed that in either case, whether I use carbonate of lime directly in step 3 or carbonate of potash, and then after step 4 recover the carbonate of potash, I obtain finally chromate of lead and sulphate of lime, and that the substances which do not reappear are lime and sulphuric acid. These combine and form sulphate of lime—an article having a commercial value quite equal to that of the uncombined lime and sulphuric acid. As to the zinc oxide which is recovered in step 3, it has a high commercial value, and the gain in weight occasioned by the combination of oxygen with the original zinc more than compensates for the slight waste involved in the various operations. Thus it follows that the expense of the entire method or process is limited to the slight waste in chromate of lead or chrome-yellow involved in the different steps and the cost of labor and skill involved in the manipulation. As to the waste of chromate of lead, however, I am of the opinion that it is very slight, and that even this slight waste is offset by the process of obtaining chromic acid from chromate of lead, which is cheaper than employing the binoxide of chromium directly.

One other marked advantage in the use of my method is to be noted here. I am enabled throughout to handle powders and solids in place of acids, and it will be readily understood that this is of vast importance, both as concerns the freedom from danger and ease in handling and the convenience and simplicity in transportation.

As I have before stated, a great variety of salts and other elements is possible in the carrying out of my general method. Thus I have shown I could inaugurate it by the treatment of bichromate of potash with hot sulphuric acid. This and other variations I regard as within the scope of my broad idea.

My method as set forth is simple and direct. There is practically no waste in the chemical elements employed and there are no difficult or inconvenient operations in their employment.

The batteries in connection with which my method is employed are of high voltage, small internal resistance, and large capacity, and are liable in the smallest degree to depositions and other injurious local action. The high efficiency of these batteries and the possibility of reclaiming all the effective material give me a practical solution of the problems involved in the use of primary batteries and enable me to reduce the expense to a minimum.

Having thus accurately described my method and indicated various ways in which the same may be practiced, I would state that what I regard as of the spirit of my invention, and desire to secure by Letters Patent of the United States, is as follows:

1. The method of recovering elements employed in connection with galvanic batteries, comprising the following steps: separating a salt into two parts, one of which contains the depolarizing element, using the depolarizing element thus obtained in a battery-fluid, treating the spent depolarizing-fluid so as to recover the metal consumed, and combining the remainder of the spent depolarizing-fluid with the unused part of the salt obtained in the first step.

2. The method of recovering elements employed in connection with galvanic batteries, comprising the following steps: separating a salt into two parts, one of which contains the depolarizing element, using the depolarizing element thus obtained alone or in combination with an acid or acid salt in a battery-fluid, treating the spent depolarizing-fluid so as to recover the metal employed or the oxide of that metal, and combining the remainder of the spent depolarizing-fluid with the unused part of the salt obtained in the first step.

3. The method of recovering elements employed in connection with galvanic batteries, comprising the following steps: treating a salt with an acid so as to separate it into two parts, one of which contains the depolarizing element, using the depolarizing element thus obtained alone or in combination with an acid or acid salt in a battery-fluid, treating the spent depolarizing-fluid so as to recover the metal employed or the oxide of that metal, and combining the remainder of the spent depolarizing-fluid with the unused part of the salt obtained in the first step to recover the original salt employed.

4. The method of recovering elements employed in connection with galvanic batteries, comprising the following steps: treating a salt with an acid so as to separate it into two parts, one of which contains the depolarizing element, using the depolarizing element thus obtained alone or in combination with an acid or acid salt in a battery-fluid, treating the spent depolarizing-fluid with an alkali or alkali carbonate so as to recover the metal employed or the oxide of that metal, and combining the remainder of the spent depolarizing-fluid with the unused part of the salt obtained in the first step to recover the original salt employed.

5. The method of recovering elements employed in connection with galvanic batteries, comprising the following steps: treating a salt with an acid so as to separate it into two parts, one of which contains the depolarizing element, using the depolarizing element thus obtained alone or in combination with an acid or acid salt in a battery-fluid, treating the spent depolarizing-fluid with an alkali or alkali carbonate, drying and igniting, and treating so as to recover the metal employed or the oxide of that metal, and combining the remainder of the spent depolarizing-fluid with the unused part of the salt obtained in the first step to recover the original salt employed.

6. The method of recovering elements employed in connection with galvanic batteries, comprising the following steps: treating a chromate of lead or other chromate with an acid so as to separate it into two parts, one of which contains chromic acid, using the chromic acid thus obtained alone or in combination with an acid or acid salt in a battery-fluid, treating the spent chromic acid so as to recover the metal employed or the oxide of that metal, and combining the remainder of the spent chromic acid with the unused part of the chromate of lead or other chromate obtained in the first step to recover the original chromate of lead or chromate employed.

7. The method of recovering elements employed in connection with galvanic batteries, comprising the following steps: treating a chromate of lead or other chromate with an acid so as to separate it into two parts, one of which contains chromic acid, using the chromic acid thus obtained alone or in combination with an acid or acid salt in a battery-fluid, treating the spent chromic acid with an alkali or alkali carbonate so as to recover the metal employed or the oxide of that metal, and combining the remainder of the spent chromic acid with the unused part of the chromate of lead or other chromate obtained in the first step to recover the original chromate of lead or chromate employed.

8. The method of recovering elements employed in connection with galvanic batteries, comprising the following steps: treating a chromate of lead or other chromate with an acid so as to separate it into two parts, one of which contains chromic acid, using the chromic acid thus obtained alone or in combination with an acid or acid salt in a battery-fluid, treating the spent chromic acid with an alkali or alkali carbonate, drying and igniting, and treating so as to recover the metal employed or the oxide of that metal, and combining the remainder of the spent chromic acid with the unused part of the chromate of lead or other chromate obtained in the first step to recover the original chromate of lead or other chromate employed.

9. The method of recovering elements employed in connection with galvanic batteries, comprising the following steps: treating a chromate of lead or other chromate with sulphuric acid so as to separate it into two parts, one of which contains chromic acid and the other sulphate of lead or other sulphate, using the chromic acid thus obtained alone or in combination with an acid or acid salt in the battery-fluid, treating the spent chromic acid so as to recover the metal employed or the oxide of that metal, and combining the remainder of the spent chromic acid with the sulphate of lead or other sulphate obtained in the first step in order to recover the original chromate of lead or other chromate employed.

10. The method of recovering elements employed in connection with galvanic batteries, comprising the following steps: treating a chromate of lead or other chromate with sulphuric acid so as to separate it into two parts, one of which contains chromic acid and the other sulphate of lead or other sulphate, using the chromic acid thus obtained alone or in combination with an acid or acid salt in the battery-fluid, treating the spent chromic acid with an alkali or alkali carbonate so as to recover the metal employed or the oxide of that metal, and combining the remainder of the spent chromic acid with the sulphate of lead or other sulphate obtained in the first step in order to recover the original chromate of lead or other chromate employed.

11. The method of recovering elements employed in connection with galvanic batteries, comprising the following steps: treating a chromate of lead or other chromate with sulphuric acid so as to separate it into two parts, one of which contains chromic acid and the other sulphate of lead or other sulphate, using the chromic acid thus obtained alone or in combination with an acid or acid salt in a battery-fluid, treating the spent chromic acid with an alkali or alkali carbonate, drying and igniting, and treating so as to recover the metal employed or the oxide of that metal, and combining the remainder of the spent chromic acid with the sulphate of lead or other sulphate obtained in the first step in order to recover the original chromate of lead or other chromate employed.

12. The method of recovering elements employed in connection with galvanic batteries, comprising the following steps: treating a chromate of lead or other chromate with sulphuric acid so as to separate it into two parts, one of which contains chromic acid and the other sulphate of lead or other sulphate, using the chromic acid thus obtained alone or in combination with an acid or acid salt in a battery-fluid, treating the spent chromic acid with carbonate of potash so as to recover the metal employed or the oxide of that metal, and combining the remainder of the spent chromic acid with the sulphate of lead or other sulphate obtained in the first step in order to recover the original chromate of lead or other chromate employed.

13. The method of recovering elements employed in connection with galvanic batteries, comprising the following steps: treating a chromate of lead or other chromate with sulphuric acid so as to separate it into two parts, one of which contains chromic acid and the other sulphate of lead or other sulphate, using the chromic acid thus obtained alone or in combination with an acid or acid salt in a battery-fluid, treating the spent chromic acid with carbonate of potash, drying, igniting, and treating so as to recover the metal employed or the oxide of that metal, and combining the remainder of the spent chromic acid with the sulphate of lead or sulphate obtained in the first step in order to recover the original chromate of lead or other chromate employed.

14. The method of recovering elements employed in connection with galvanic batteries, comprising the following steps: treating a chromate of lead or other chromate with sulphuric acid so as to separate it into two parts, one containing chromic acid and the other sulphate of lead or other sulphate, using the chromic acid thus obtained alone or in combination with an acid or acid salt in a battery-fluid, treating the spent chromic acid with carbonate of potash, drying, igniting, and treating so as to recover the metal employed or the oxide of that metal, combining the remainder of the spent chromic acid with the sulphate of lead or other sulphate obtained in the first step to recover the original chromate of lead or other chromate employed and to leave sulphate of potash as a residuum, and finally precipitating the sulphate of potash with carbonate of lime to obtain sulphate of lime and carbonate of potash.

15. The method of recovering the zinc consumed in a primary battery, consisting of combining the spent depolarizing-fluid with an alkali or alkali carbonate, drying, igniting, and separating out the zinc or its oxide.

16. The method of recovering the zinc consumed in a primary battery, consisting of combining the spent depolarizing-fluid with carbonate of potash, drying, igniting, and separating out the zinc or its oxide.

17. The method of recovering the zinc consumed in a chromic-acid battery, consisting of combining the spent chromic and other acids with carbonate of potash, drying, igniting, and separating out the zinc or its oxide.

In testimony whereof I have hereunto set my hand in the presence of two subscribing witnesses.

JOSEPH B. GARDINER.

Witnesses:
  WM. DILLON,
  N. A. POLLARD.